United States Patent [19]
Weill

[11] 3,948,613
[45] Apr. 6, 1976

[54] PROCESS FOR APPLYING A PROTECTIVE WEAR SURFACE TO A WEAR PART

[76] Inventor: Theodore C. Weill, 110 Carol Circle, Tylertown, Miss. 39667

[22] Filed: May 6, 1974

[21] Appl. No.: 467,192

Related U.S. Application Data

[62] Division of Ser. No. 312,860, Dec. 7, 1972, Pat. No. 3,894,674.

[52] U.S. Cl. .................. 29/191; 29/195; 29/182.3
[51] Int. Cl.² ..................................... B32B 15/04
[58] Field of Search ..... 29/195, 191, 182.32, 472.9, 29/481, 482, 484, 504, 473.1; 51/293, 297, 307, 309; 106/143; 144/128; 90/34 R; 82/32

[56] References Cited
UNITED STATES PATENTS

| | | | |
|---|---|---|---|
| 2,044,853 | 6/1936 | Laise | 29/182.3 X |
| 2,414,231 | 1/1947 | Kraus | 29/195 A X |
| 2,694,852 | 11/1954 | Rogers | 29/195 A |
| 3,061,525 | 10/1962 | Grazen | 29/195 A X |
| 3,345,734 | 10/1967 | Sowko | 29/195 A X |
| 3,452,394 | 7/1969 | McNeal, Jr. | 425/379 |
| 3,599,316 | 8/1971 | Moskal | 29/504 X |
| 3,756,796 | 9/1973 | Miller | 51/293 |
| 3,777,517 | 12/1973 | Shwayder et al. | 29/195 A |
| 3,790,353 | 2/1974 | Jackson et al. | 29/182.3 X |
| 3,844,011 | 10/1974 | Davies | 29/191.2 |

*Primary Examiner*—C. Lovell
*Assistant Examiner*—E. L. Weise
*Attorney, Agent, or Firm*—Price, Heneveld, Huizenga & Cooper

[57] ABSTRACT

A process for providing a tungsten carbide wear surface to wear parts with relatively large wearing surfaces employs treated and nickel plated tungsten carbide tiles arranged in a matrix and brazed to a surface to be protected by employing low temperature brazing.

7 Claims, 6 Drawing Figures

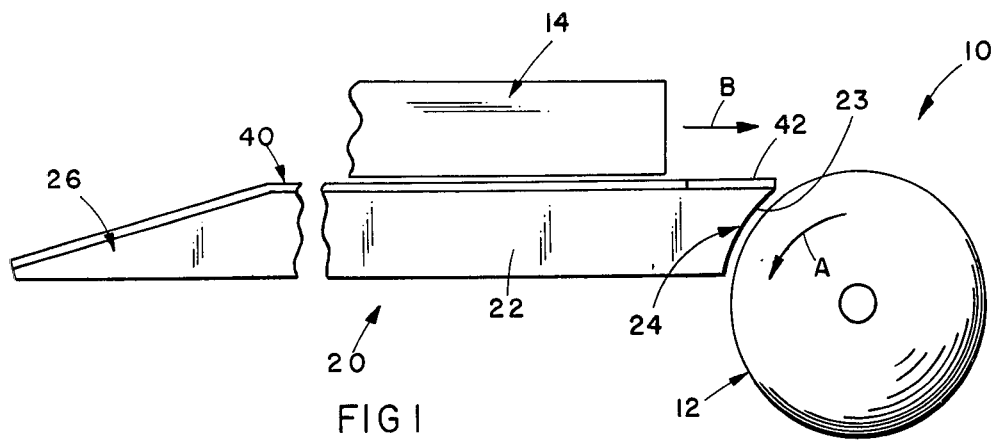
FIG 1
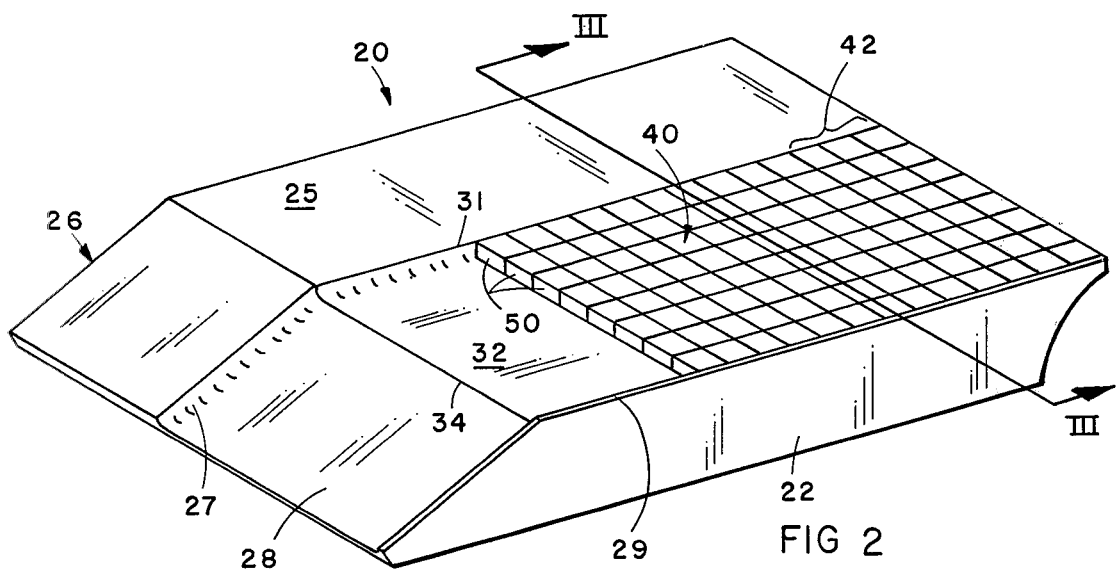
FIG 2
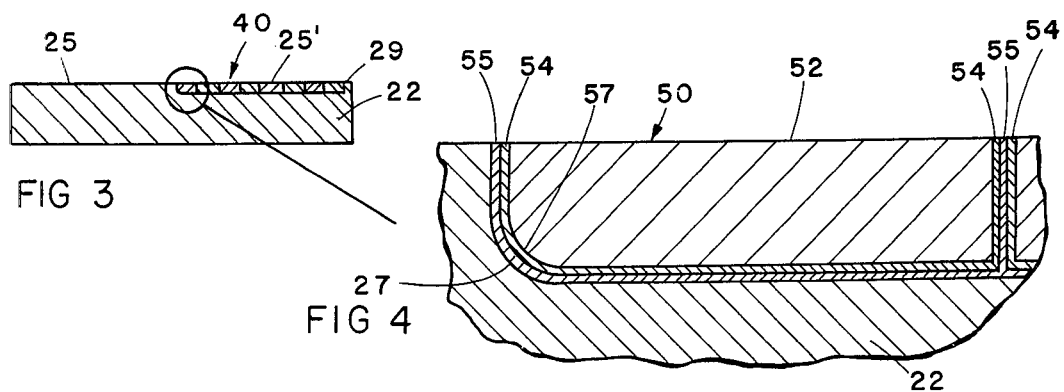
FIG 3
FIG 4

PROCESS FOR APPLYING A PROTECTIVE WEAR SURFACE TO A WEAR PART

This is a division of application Ser. No. 312,860, filed Dec. 7, 1972, now U.S. Pat. No. 3,894,674, dated July 15, 1975.

BACKGROUND OF THE INVENTION

The present invention relates to a process for the manufacture of wear parts having a relatively large wear surface area, and the product formed thereby.

In woodworking and other industries employing machinery having relatively large surface area wear parts such as bed plates for planers or the like; the wear parts frequently become worn within a relatively short period of time and require frequent replacement. This results even though efforts have been made to surface harden the parts or manufacture the parts with chill cast iron or hard metals. In some cases, the wearing surface of the large surface area parts have been chrome plated to attempt to increase their wearability. Although these efforts have resulted in a somewhat increased life as compared with untreated surfaces, the parts so treated still wear out with undesirable frequency.

It has long been recognized that tungsten carbide material provides an excellent wear surface with durability far surpassing other wear surfaces. In order to tungsten carbide plate relatively large surface areas, however, the temperature required is in the order of 1,300° F. This temperature is necessary when for example, tungsten carbide plating a wear surface to a thickness of approximately 1/16 inch. When heating a relatively large area bed plate or the like to such temperatures, warpage becomes a tremendous problem. As the wear part cools after the plating process, the wear surface will generally be uneven due to the warpage. With only 1/16 inch thickness conventionally capable by tungsten carbide plating, the surface cannot normally be flattened by grinding while still maintaining the desired protective cover. Thus, efforts to tungsten carbide plate large surface wear parts has generally not been successful.

To overcome the difficulties in tungsten carbide plating large surfaces, tungsten carbide tiles have been employed by brazing the tiles directly to the wear part at relatively high temperatures (1300° F. or higher) thereby providing a thick tungsten carbide protective cover with the resulting matrix of the tiles. In such an attempt, however, the high temperature causes the same warpage problems encountered with tungsten carbide plating resulting in an uneven surface which must be ground considerably to achieve the desired flatness. In addition, due to the relatively large area encountered, the high temperature brazing process is extremely time consuming and dangerous to personnel attempting to cover a wear part using such a process. Also, the amount of grinding necessary to achieve a flat surface considerably reduces the effective protective surface of the tiles since considerable material must frequently be ground away.

To overcome the difficulty of the high temperature brazing of tungsten carbide tiles on large surface areas, an attempt has been made to employ a bonding adhesive such as epoxy to hold the tiles on the surface of the wear part. Although this process overcomes the difficulties of warpage and hazardousness to the personnel, the adhesion has not been satisfactory under the high shear forces encountered by the parts during usage. Frequently, during use a tile loosens from the wear part due to the inadequate bonding achieved.

Thus, the attempted known methods have been inadequate to provide wear parts having large wear surfaces which are extremely durable and long-lasting. Conventional plating and the like does not provide the protective coating achievable with tungsten carbide plating while plating and known methods of adhering tungsten carbide tiles to wear surfaces have not proven adequate or commercially feasible.

SUMMARY OF THE INVENTION

The present invention solves the difficulties encountered in providing large wear surface areas with wear parts by providing a pattern of uniquely treated tiles of wear-resistant material brazed to the surface to be protected to permit the bonding of the tiles to a surface employing low temperature brazing. The resultant part displays excellent wearing properties and the bonding between the pattern and the wear part securely holds the tiles in position during use.

Processes embodying the present invention include the steps of treating wear-resistant tiles and arranging them in a pattern on a surface to be protected. The tiles are then bonded to the surface by low temperature brazing. A broader aspect of the present invention provides a process for preparing a tungsten carbide surface for adhesion to a metallic surface by low temperature brazing.

Wear parts embodying the present invention include a recessed surface adapted to receive a pattern of treated wear-resistant tiles which are bonded to the plate within the recess with hard solder.

It is an object, therefore, of the present invention to provide improved wear parts having relatively large wear surfaces.

Another object of the present invention is to provide a wear part having a wear surface formed of a matrix of tungsten carbide tiles bonded to the surface of the part.

A further object of the present invention is to provide a process for bonding tungsten carbide tiles to a metallic surface.

Still a further object of the present invention is to provide a method of preparing tungsten carbide tiles for bonding to a metallic surface.

These and other objects of the present invention will become apparent upon reading the following specification together with the drawings in which:

BRIEF DESCRIPTION OF THE DRAWINGS

FIG. 1 is a fragmentary schematic side elevational view of a portion of a planer including a bed plate embodying the present invention;

FIG. 2 is a rear perspective view of the bed plate shown in FIG. 1 with a portion of the wear surface not shown to clearly illustrate the recess formed in the plate;

FIG. 3 is a cross-sectional view of the bed plate taken along the plane III—III of FIG. 2;

FIG. 4 is a fragmentary enlarged sectional view of the portion of the plate circled in FIG. 3 showing the plating and solder in exaggerated dimensions;

DETAILED DESCRIPTION OF THE PREFERRED EMBODIMENT

Figure 5:
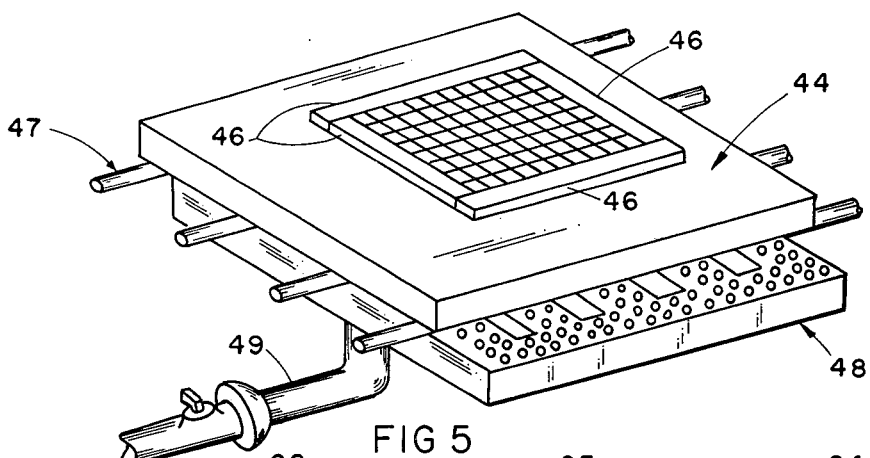
FIG. 5 is a fragmentary perspective view of an open furnace employed to tin the pattern of tungsten carbide tiles and shows a matrix positioned thereon during the process.

Referring now to FIGS. 1, 2 and 3, there is shown a portion of a planing apparatus 10 including a bed plate 20 embodying the present invention and manufactured by the process of the present invention. The planing apparatus includes suitable structure (not shown) supporting the bed plate immediately adjacent a cutter wheel 12 also shown schematically in FIG. 1. Wheel 12 rotates in a direction indicated by arrow A to plane the bottom surface of a board 14 or other work piece fed across the surface of the bed plate 20 in a direction indicated by arrow B. Wheel 12 includes suitable cutter blades mounted therein and conventional means (not shown) for rotating the wheel to achieve the planing of the board as it is fed therethrough. Although the preferred embodiment of the invention is illustrated as a bed plate used for planing apparatus, it is to be understood that the present invention can be used with a variety of other woodworking and metal machining equipment which require relatively large area wear surfaces.

The bed plate 20 comprises a steel body or base member 22 having a curved forward edge 24 which is surface hardened at 23 by conventional surface hardening techniques. This surface is arcuate shaped to conform to the arc of cutting wheel 12 and is positioned immediately adjacent the wheel. Surface hardening 23 prevents the erosion of the curved forward edge of the bed plate due to chips removed from the board and propelled downwardly between the wheel and the bed plate. The body of the bed plate further includes a tapered rear lip 26 which facilitates the feeding of boards onto the planer.

As seen in FIG. 2, the wear surface of bed plate 20 has a recess 28 ground through the top surface 25 and extending the length of the bed plate. Recess 28 as formed defines an outer shoulder 29 extending along the length of the near side of the bed plate. Shoulder 29 and the opposite interior shoulder 31 of the recess are curved at the junctions 27 of the shoulders with the floor 32 of recess 28 as seen in FIG. 4.

Recess 28 is adapted to receive a pattern 40 comprised of rectangular tiles 50 of highly wear-resistant material such as tungsten carbide 52 (FIG. 4). The pattern employed in the preferred embodiment is a matrix of tiles in rows extending across the recess and columns extending the length of the recess. In other embodiments with different shaped tiles, the pattern can be arranged in any desired manner to provide a continuous wear surface. As described below, the tungsten carbide tiles 50 are specially treated such that they can be bonded to the bottom surface of recess 28 and within the recess to secure the wear surface so formed to the body of the bed plate. The forward three rows (indicated at 42 in FIGS. 1 and 2) of tiles are bonded at the forward edge 24 of the bed plate by conventional high temperature brazing. Since the leading rows of tiles span a relatively small area, the high temperature brazing of this portion of the wear surface of the bed plate does not cause sufficient warpage of the plate which would lead to the difficulties noted earlier.

The first three rows 42 may, in some embodiments, be bonded to the bed plate in the same manner as the remaining portion of the pattern 40 as described below. In the preferred embodiment, however, area 42, where the maximum shear forces are present, is high temperature conventionally brazed using thicker untreated tiles to compensate for limited warpage that may occur in this area. The high temperature brazing affords a somewhat increased bonding adhesion of the first three rows of tiles to enable the wear surface thereformed to resist the extremely high shear forces along the leading edge of the bed plate adjacent the planer wheel 12.

A portion of the pattern 40 toward the rear of the bed plate is not shown in FIG. 2 such that the shape of the recess 28 can be clearly seen. It is understood that in the completed bed plate, the entire recess is filled with the matrix of tiles. As seen in FIGS. 3 and 4, the treated tiles are fitted across the width of the recess 28 and extend flush with the top surface 25 of the bed plate to provide a highly resistant wear surface 25' along the forward portion of the bed plate in the path of travel of the work pieces. The tiles are configurated and the bed plate formed such that the edge 34 between the flat portion of the bed plate and the downwardly tapered end 26 occurs at the intersection of two rows of tiles. The declining angle of end 26 is sufficiently small such that the wear surface 25' formed by the pattern presents a smooth and continuous surface for the work piece as it travels onto and across the bed plate.

Recess 28 can be 8 or 12 inches wide and is approximately 8 inches wide in the embodiment shown. The rectangular tiles are 1 inch squares of tungsten carbide material 52 forming the heart of the tiles 50 as seen in FIG. 4. Also as seen in FIG. 4, the tiles have a coating of nickel plating 54 and are bonded to the base 22 by solder 55. The thickness of plating 54 and solder 55 is shown by necessity in exaggerated form in FIG. 4. In the preferred embodiment shown where the depth of the recess is approximately 5/64 inch, the relatively thin 1 inch square tiles 50 are approximately 3/32 inch thick such that they extend slightly above the surface 25 of the bed plate until ground flat as described below. The treatment of the tungsten carbide tiles and the bed plate such that they can be bonded together to assure the desired wearability properties without loosening during use is now described.

Figure 6:
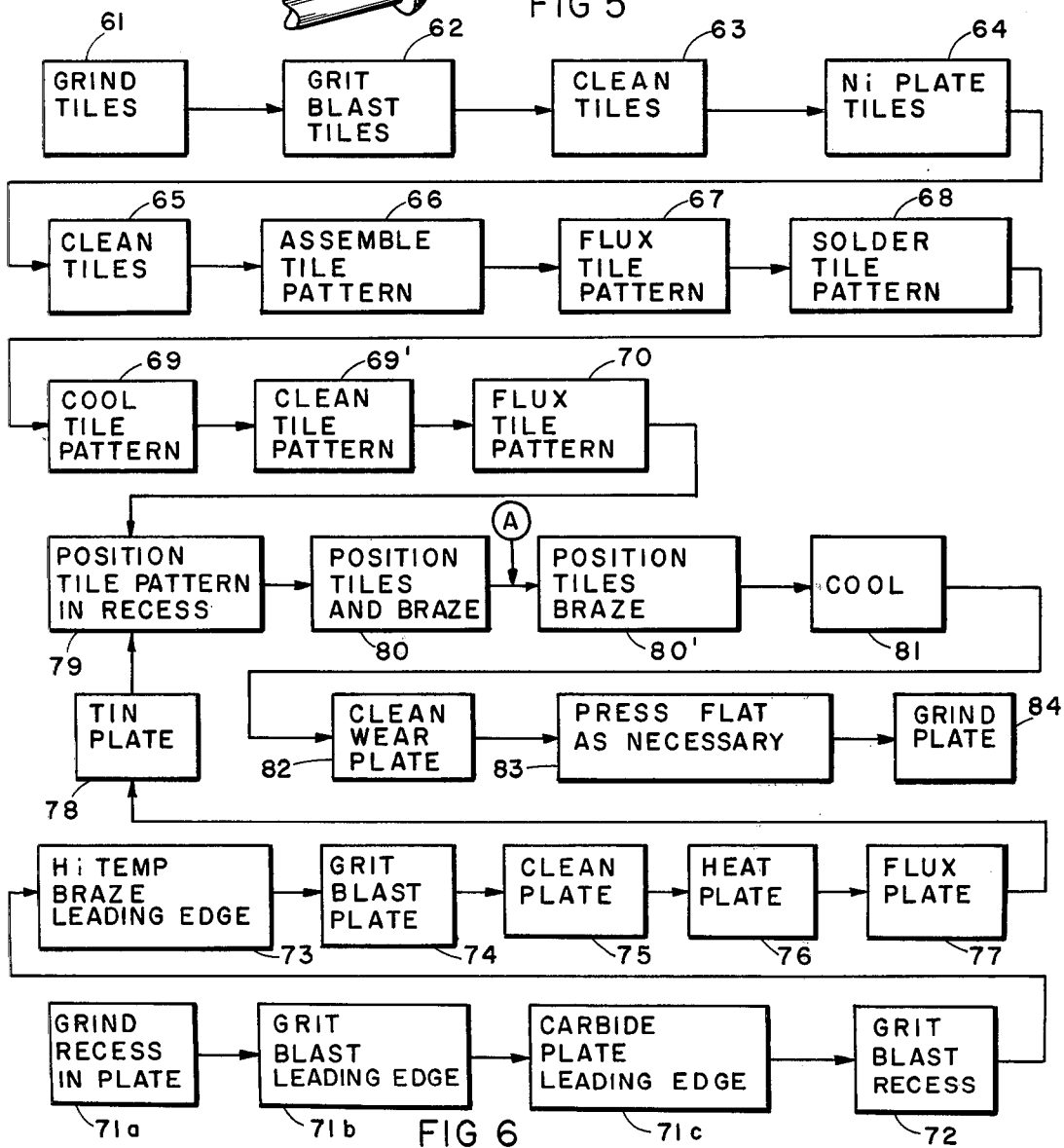
FIG. 6 is a flow diagram in block form showing the process employed in manufacture the bed plate shown in FIGS. 1–4.

Referring now to FIG. 6 which is a flow diagram of the process embodying the present invention, first a description of the treatment of the tungsten carbide tiles is presented, followed by a description of the processing of the bed plate, then the bonding of the tiles to the plate is described. The rectangular tiles of tungsten carbide are available from commercial suppliers in their untreated form having rough dimensions 1 inch square and 3/32 inch thickness. Other dimensions are also available. Several of the tiles are chamfered along one edge 57, as seen in FIG. 4, such that they can be used along the two outside columns adjacent shoulders 31 and 29. The first step 61 (FIG. 6) in processing the untreated tiles is to grind the major surfaces flat to 0.001 inch. This is achieved by positioning them on a magnetic holding table and grinding them with a conventional diamond wheel.

After the tungsten carbide tiles are ground, they are abraded by grit blasting them as indicated by step 62 in FIG. 6. To achieve this, the tiles are placed for approximately 5–10 minutes to a tumbling cylindrical drum rotating at 10 r.p.m. The grit employed is commercially available 46/70 WSC silicone carbide applied under 100–140 p.s.i. to treat the tiles. This step provides greater surface to effect bonding of the tiles. After the grit blasting, the tiles are cleaned in a solvent comprising trichloroethylene in a bath at room temperature and agitated for 1–2 minutes as indicated by step 63. The tiles are then dried using a stream of pressurized air.

In order to tin the tiles and to improve the wetting action during tinning and the adhesion of the tiles to the bed plate, the partially treated tiles are then nickel plated by employing a sulfomated nickel plating process as follows. First, the tiles are anodically plated for 2–3 minutes in a solution of 1 pound per gallon of nickel chloride and one quart per gallon of hydrochloric acid at room temperature and an electrode current of 30 amps per foot square of surface area. After the initial strike plating, the tiles are cathodically plated to 50–75 micro-inches of nickel in the same bath. The tiles are then removed and rinsed in a water bath or a 10% sulfuric acid bath and placed in a second plating bath comprising a 48% solution of nickel sulfomate bath commercially available. They are plated in this bath at 100°–150° F. at 100 amps per square foot of surface area until a plating thickness of approximately 0.0005 inch is achieved. This completes the nickel plating process as indicated as step 64 in FIG. 6.

After nickel plating, the tiles are cleaned (step 65) in a 50% solution of muriatic acid and then in trichloroethylene followed by a drying stream of pressurized air. The plated and cleaned tiles are then assembled (step 66) in a matrix pattern on a ceramic pattern 44 shown in FIG. 5. Platen 44 provides a non-sticking support surface for the tiles and a surface which can be heated without contaminating the tiles. Although the ceramic platen 44 is an insulator, it is sufficiently thin to conduct heat for tinning the tiles by soldering or low temperature brazing. To facilitate arranging the treated tiles 50 in the matrix, edge guides 46 are employed as seen in FIG. 5. The surface of the platen 44 is cleaned with trichloroethylene or other suitable cleaning agent to prevent contamination of the tiles resting thereon.

The platen holding the matrix and edge guides is positioned on grates 47 shown in FIG. 5, which are supported above a gas fired burner 48 coupled to a supply of gas 49. The support structure for the grates and the burner is conventional and is not shown in the figures. The matrix is then fluxed with an acid flux by brushing the flux on the surface of the tiles. As the burner 48 begins applying heat to the platen, a sheet of silver solder approximately 8 inches by 10 inches 0.004–0.006 inch thick is cleaned with trichloroethylene then fluxed on both sides with the same acid flux used on the tiles. The commercially available silver solder (55 in FIGS. 3 and 4) comprises: silver 4%, zinc 16.6%, copper 1% and cadmium 78.4%. This combination of elements yields a melting point of approximately 500° F. and a flow point of approximately 625° F. The solder is available in rolled sheet stock which can be cut to the desired sheet size to cover the tile matrix.

The cleaned and fluxed sheet solder is then positioned on the top surface of the matrix and once the flow point is reached, additional flux is applied as necessary until the surfaces of the tiles are uniformly and thoroughly tinned with solder. This step is indicated by block 68 in FIG. 6. It is noted here that the terms "solder" and "low temperature brazing" are used synonymously to describe the process in which the hard or silver solder is applied to the tiles and the bed plate and their bonding together. This process so described is distinguished from conventional low temperature "soft" soldering using a high lead content solder or conventional high temperature brazing employing brass or other brazing materials.

After the tinning of the tile matrix, the platen 44 is removed from the burner and the pattern allowed to air cool until the solder has hardened. Typically, the tiles will be bonded together although this is not essential to the process. It is noted that during the tinning process, the edge guides 46 can be removed such that the tiles can be shifted in position for thoroughly tinning the edges as well as the top surface thereof. After the cooling step 69, the tile matrix is cleaned in a water rinse, as indicated by step 69', during which the surface is wire brushed until clean and relatively shiny.

Since the bed plate requires two 8 by 10 inch tile matrices similarly treated, the process 61–69' is repeated for the second matrix to be employed with a bed plate. It is noted here that steps 61–64 are generally performed on a large supply of tiles and only steps 65–69' need be repeated for the manufacture of each bed plate. As noted above, the bed plate 20 has a recess 28 ground therein. The bed plates can be purchased with the recess or they can be formed by grinding a flat bed plate as indicated by step 71a of FIG. 6. Once the recess is formed in the plate, the curved leading edge 24 is abraded by grit blasting (71b in FIG. 6) using the same silicone carbide grit as employed with step 62. Edge 24 is then carbide plated (step 71c) by a conventional method. Recess 28 is then abraded (step 72) over the area covered by the first three rows of tiles.

After this preparation of the bed plate, the leading three rows 42 of tiles (selected after step 65 has been performed thereon) are high temperature brazed to the front edge of the plate as indicated by step 73 in FIG. 6. The high temperature brazing is conventional and employs temperatures of approximately 1300° F. Once the leading three rows of tiles have been brazed to the plate and it has cooled, the entire surface of the plate is grit blasted as indicated by step 74. This insures that all foreign material from the high temperature brazing step has been removed and the surface is abraded to provide the maximum bonding between the similarly abraded surfaces of the tiles.

The plate is then cleaned using trichloroethylene followed by a drying jet of air as indicated by step 75. The plate is then positioned on a flat bed furnace which comprises a plurality of strips of electrical heaters capable of heating the plate to a temperature of 650° F. or slightly higher. A thermocouple control unit is employed to maintain the surface temperature of the plate at approximately 650° F. which is slightly above the flow point of the solder employed to bond the tile to the plate. The heating step is indicated in block 76. As the plate heats up, acid flux is applied (step 77) to the entire top surface of the bed plate to prevent contaminates from reaching the surface 32 of the recess. It is noted that the leading three rows 42 of the partially manufactured plate will not loosen at a temperature of 650° F. since it is substantially below the melting point of the high temperature brazing employed.

As the plate is heated, a sheet of cleaned and fluxed solder 55 of the same type employed for step 68 and cut to fit within the recess 28 is positioned therein and paddled and fluxed as necessary to tin the bottom surface 32 of recess 28. The excess flux and solder is squeegeed out leaving a heated and tinned surface for receiving the tile matrices. At this time, two of the tile matrices which have been cleaned are fluxed as indicated by step 70 following step 69', and are positioned within the recess with the tinned surface facing downwardly to contact surface 32 of the recess as indicated by step 79.

The first tile matrix is generally positioned somewhat rearwardly of the leading edge and the tiles are shifted individually or in small groups to their final position. After the first matrix has been positioned on the heated bed plate, the second matrix is fluxed and positioned within the recess 28 of the heated plate 20 with the tinned face down as indicated by the circled arrow A between blocks 80 and 80' of FIG. 6. The tiles of the second matrix are positioned by shifting (in a more limited fashion), as indicated by block 80', to insure adhesion of the tiles to the recess. It is noted that during the low temperature brazing and positioning steps (80, 80') utilized, flux can be added as desired as can additional solder of the same content. Since the recess is slightly wider than one of the rows of tiles, the tiles are positioned along one of the shoulders 29 or 31 as snugly as possible and a ⅛ inch diameter soldering wire of the same content as solder 55 is fitted within the resulting small gap along the opposite shoulder while the plate is heated. This fills the recess completely with solder. Although it is not necessary to provide the slightly extra width of the recess, it is convenient in positioning the tiles and facilitates the manufacture of the plate.

Once the brazed plate has air cooled, as indicated by step 81, it is cleaned in a water bath as indicated by step 82. Then the bed plate is checked for gross flatness and, if necessary, is pressed in a 200 ton press to assure general flatness of the plate. It is noted that since the bed plate cools from 650° F. to room temperature instead of 1300° F. to room temperature as necessary with high temperature brazing, warpage is generally limited to less than 0.015 inch and can be corrected by the pressing step if necessary. With high temperature brazing or tungsten carbide plating, warpage frequently exceeded 0.060 inch and could not be corrected. In the event that any one of the tiles has not properly adhered or has otherwise fitted within the pattern 40, local heat can be applied to the underside of the bed plate aligned below the faulty mounted tile being careful not to exceed the flux breakdown temperature of approximately 800° F. and the tile can be repositioned singly. Generally, however, this is not necessary.

After the pressing and flattening step 83, the entire surface of the bed plate is ground flat to 0.001 inch, as indicated by step 84, thereby completing the manufacture of a bed plate and providing a wear surface 25' which is substantially flat and presents a tungsten carbide surface to the work piece. It is noted that during the grinding step, the nickel plate on the top surface of the tiles is removed and surface 25' is substantially flush with surface 25 as seen in FIG. 4.

Although tungsten carbide tiles have been employed since they provide the desired wear properties, tiles of other materials such as hardened steel can be employed where the wearability of tungsten carbide is not required. Although most of the steps described during the manufacture of the matrix and the positioning of the matrix within recess 28 have been performed manually, it may be possible to automate this process to form the tile matrices and insert them in the plate.

The preferred embodiment describes the use of particular chemicals and agents employed for the processes herein described. It will become apparent to those skilled in the art that equivalent chemicals, agents or the like may be substituted in some of the steps. Also, the tiles need not be square and could be any desired configuration as, for example triangular, as long as they could be arranged in a continuous pattern to form the desired wear surface. These and other modifications, however, will fall within the scope of the present invention as defined by the appended claims.

The embodiments of the invention in which an exclusive property or privilege is claimed are defined as follows:

1. A wear part having a relatively large wear surface, said part comprising:
   a steel base member having a surface thereon exposed to wearing conditions;
   a plurality of wear-resistant tiles of material positioned on said base member in a pattern to substantially cover the wear-exposed surface of said base member, said tiles having an abraded surface facing said base member; and
   solder means having a melting point below 800°F disposed between said tiles and said base member for bonding said tiles to said base member.

2. The wear part as defined in claim 1 wherein said base member includes a single recess formed therein to span the wear-exposed surface and said tiles are positioned within said recess.

3. The wear part as defined in claim 2 wherein said tiles are relatively thin rectangular members.

4. The wear part as defined in claim 2 wherein said tiles are square.

5. The wear part as defined in claim 4 wherein said tiles comprise tungsten carbide, said tiles being plated with nickel only on their lower, abraded surfaces and along their side edges.

6. The wear part as defined in claim 5 wherein said solder is a silver solder having a melting point of approximately 500°F and a flow point of approximately 625°F.

7. A bed plate having a wear surface, comprising:
   a base member having a single recess formed therein spanning the wear-exposed surface of said bed plate;
   a plurality of tungsten carbide tiles high temperature brazed to said base member within the forward portion of said recess at the leading edge of said plate;
   a plurality of tungsten carbide tiles hard soldered to said base member within the remaining portion of said recess by a silver solder alloy having a melting point of approximately 500°F and a flow point of approximately 625°F.

* * * * *

UNITED STATES PATENT AND TRADEMARK OFFICE
CERTIFICATE OF CORRECTION

PATENT NO. : 3,948,613
DATED : April 6, 1976
INVENTOR(S) : Theodore C. Weill

It is certified that error appears in the above-identified patent and that said Letters Patent are hereby corrected as shown below:

Column 3, line 2:
 "in" should be --- to ---.

Column 4, line 65:
 "to" should be --- in ---.

Column 5, line 30:
 "pattern" should be --- platen ---.

Column 8, line 38:
 "2" should be --- 3 ---.

Signed and Sealed this

Fourteenth Day of September 1976

[SEAL]

Attest:

RUTH C. MASON
*Attesting Officer*

C. MARSHALL DANN
*Commissioner of Patents and Trademarks*